US012229053B1

(12) United States Patent
Raff et al.

(10) Patent No.: US 12,229,053 B1
(45) Date of Patent: Feb. 18, 2025

(54) MANAGING LOCKS IN A TRANSACTIONAL CACHE

(71) Applicant: Dell Products L.P., Round Rock, TX (US)

(72) Inventors: Jason Raff, Bedford, NH (US); Vikram Prabhakar, Apex, NC (US); Socheavy Heng, Framingham, MA (US)

(73) Assignee: Dell Products L.P., Round Rock, TX (US)

( * ) Notice: Subject to any disclaimer, the term of this patent is extended or adjusted under 35 U.S.C. 154(b) by 55 days.

(21) Appl. No.: 18/227,439

(22) Filed: Jul. 28, 2023

(51) Int. Cl.
*G06F 12/00* (2006.01)
*G06F 12/0882* (2016.01)
*G06F 12/14* (2006.01)

(52) U.S. Cl.
CPC ...... *G06F 12/0882* (2013.01); *G06F 12/1466* (2013.01)

(58) Field of Classification Search
CPC .......................... G06F 12/0882; G06F 12/1466
USPC ......................................................... 711/118
See application file for complete search history.

(56) References Cited

U.S. PATENT DOCUMENTS

| 7,484,058 | B2 | 1/2009 | Frey et al. |
| 7,555,614 | B1 | 6/2009 | Haynes et al. |
| 7,617,365 | B2 | 11/2009 | Zhang et al. |
| 9,519,664 | B1 * | 12/2016 | Kharatishvili .......... G06F 16/27 |
| 9,781,057 | B1 | 10/2017 | Foley et al. |
| 10,430,389 | B1 | 10/2019 | Gupta et al. |
| 10,620,842 | B1 * | 4/2020 | Vokaliga ............. G06F 12/0802 |

FOREIGN PATENT DOCUMENTS

JP          2575543 B2 *  1/1997

* cited by examiner

*Primary Examiner* — Mardochee Chery
(74) *Attorney, Agent, or Firm* — BainwoodHuang

(57) ABSTRACT

A technique of managing locks in a transaction cache includes opening, in the transactional cache, a first transaction identifying a first plurality of pages to be accessed and a second transaction identifying a second plurality of pages to be accessed, where the first plurality of pages has at least one page in common with the second plurality of pages. The technique further includes selecting a target page that is highest in a predefined page ordering out of the at least one page in common. The second plurality of pages includes a lower-ordered page that is lower in the predefined page ordering than the target page. The technique further includes, while the first transaction is open, inserting a first lock request of the second transaction into a queue of the target page and preventing insertion of a second lock request of the second transaction into a queue of the lower-ordered page.

19 Claims, 11 Drawing Sheets

MANAGING LOCKS IN A TRANSACTIONAL CACHE

BACKGROUND

Data storage systems are arrangements of hardware and software in which storage processors are coupled to arrays of non-volatile storage devices, such as magnetic disk drives, electronic flash drives, and/or optical drives. The storage processors, also referred to herein as "nodes," service storage requests arriving from host machines ("hosts"), which specify blocks, files, and/or other data elements to be written, read, created, deleted, and so forth. Software running on the nodes manages incoming storage requests and performs various data processing tasks to organize and secure the data elements on the non-volatile storage devices.

Many storage systems perform data access operations in atomic groups called "transactions." Before accessing a page in a cache as part of a transaction, a node obtains a lock on the page and assigns ownership of the lock to the transaction. The lock maintains data consistency by blocking or otherwise limiting access to the page by other transactions. Only after the transaction has completed (either by being committed or aborted) does the node release the lock on the page.

SUMMARY

A node may process multiple transactions concurrently. It is thus possible for deadlocks to arise. Deadlocks arise when multiple transactions prevent one another from completing and releasing their locks. For example, consider a situation in which a first transaction owns a lock on a first page while a second transaction owns a lock on a second page. Further, suppose that each transaction later requires access to the first or second page locked by the other transaction. In such circumstances, deadlock occurs because each transaction cannot complete until the other one completes and releases its locks: the first transaction waits for the second transaction to complete and release its lock on the second page while the second transaction waits for the first transaction to complete and release its lock on the first page. Such deadlock prevents either transaction from completing, impairing system performance.

Various approaches to prevent deadlock have been proposed. In one approach, a first lock request in a transaction is issued as a "blocking" lock request (also called a "hard lock"), e.g., one that is inserted into a queue of a target page regardless of whether another transaction owns a lock on the target page. Each subsequent lock request in the same transaction is then issued as a "non-blocking" lock request (also called a "try lock"), e.g., one that is granted if a target page is immediately available but is otherwise denied. If a try lock is denied, it can later be retried. This approach prevents a situation in which any transaction simultaneously (1) owns a lock on one page and (2) waits for a lock on another page. In this manner, deadlock cannot occur because no transaction will prevent another transaction from completing.

Unfortunately, the above-described approach can be inefficient. For example, that approach typically issues a separate command for each page to be locked, e.g., by issuing a first command to lock a first page and separately issuing a second command to lock a second page. However, servicing these commands separately consumes more processing cycles than would be needed for servicing a single command to lock multiple pages. Further, the profuse use of try locks can be wasteful, as they typically involve repetitively retrying lock requests if they fail. What is needed is an approach that avoids deadlock in a more efficient manner.

The above need is addressed at least in part by an improved technique of managing locks in a transactional cache that selectively inserts lock requests into queues according to a predefined page ordering. The technique includes opening, in the transactional cache, a first transaction identifying a first plurality of pages to be accessed. The technique further includes opening, in the transactional cache, a second transaction identifying a second plurality of pages to be accessed, where the first plurality of pages has at least one page in common with the second plurality of pages. The technique further includes, after opening the first transaction and the second transaction, selecting a target page that is highest in the predefined page ordering out of the at least one page in common. The second plurality of pages includes a lower-ordered page that is lower in the predefined page ordering than the target page. The technique further includes, while the first transaction is open, inserting a first lock request of the second transaction into a queue of the target page and preventing insertion of a second lock request of the second transaction into a queue of the lower-ordered page.

Advantageously, the improved technique can improve performance by delaying the issuance of certain lock requests that have the potential to cause deadlocks. Further, the technique enables a decrease in the usage of try locks, improving the utilization of processor resources.

Certain embodiments are directed to a method of managing locks in a transactional cache. The method includes opening, in the transactional cache, a first transaction identifying a first plurality of pages to be accessed. The method further includes opening, in the transactional cache, a second transaction identifying a second plurality of pages to be accessed, where the first plurality of pages has at least one page in common with the second plurality of pages. The method further includes selecting a target page that is highest in the predefined page ordering out of the at least one page in common, where the second plurality of pages includes a lower-ordered page that is lower in the predefined page ordering than the target page. The method further includes, while the first transaction is open, (i) inserting a first lock request of the second transaction into a queue of the target page and (ii) preventing insertion of a second lock request of the second transaction into a queue of the lower-ordered page.

Other embodiments are directed to a computerized apparatus constructed and arranged to perform a method of managing locks in a transactional cache, such as the method described above. Still other embodiments are directed to a computer program product. The computer program product stores instructions which, when executed on control circuitry of a computerized apparatus, cause the computerized apparatus to perform a method of managing locks in a transactional cache, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION

Embodiments of the improved technique will now be described. One should appreciate that such embodiments are provided by way of example to illustrate certain features and principles but are not intended to be limiting.

An improved technique of managing locks in a transaction cache includes opening, in the transactional cache, a first transaction identifying a first plurality of pages to be accessed and a second transaction identifying a second plurality of pages to be accessed, where the first plurality of pages has at least one page in common with the second plurality of pages. The technique further includes, after opening the first transaction and the second transaction, selecting a target page that is highest in the predefined page ordering out of the at least one page in common, where second plurality of pages includes a lower-ordered page that is lower in the predefined page ordering than the target page. The technique further includes, while the first transaction is open, inserting a first lock request of the second transaction into a queue of the target page and preventing insertion of a second lock request of the second transaction into a queue of the lower-ordered page.

In some arrangements, the improved technique is applied to a transactional cache that stores pages of data which may be accessed in transactions. A transaction is a grouping of operations that are committed or aborted atomically. Before accessing a page as part of a transaction, the transaction obtains ownership of a lock on the page to block or otherwise limit access to the page by other transactions. This process helps to maintain data consistency by preventing the other transactions from changing the page while access operations are ongoing. A transaction typically retains ownership of a lock until the transaction completes, upon which the transaction releases the lock.

The improved technique is amenable to a variety of implementations. In some arrangements, a single storage processing node is configured to open multiple transactions in a transactional cache. In these arrangements, the node provides lock queues of respective pages in the transaction cache, into which the node may insert lock requests. The node is configured to prevent deadlock by managing which lock requests will be inserted into the queues and when.

In other arrangements, multiple storage processing nodes have shared access to a transactional cache distributed across the nodes. Each of the nodes may open its own transactions and communicate with other nodes to obtain permission to grant ownership over locks to transactions. Each node in a "multi-node" implementation may apply methodologies as described herein to avoid deadlock both between multiple nodes and internally within a single node.

Figure 1:
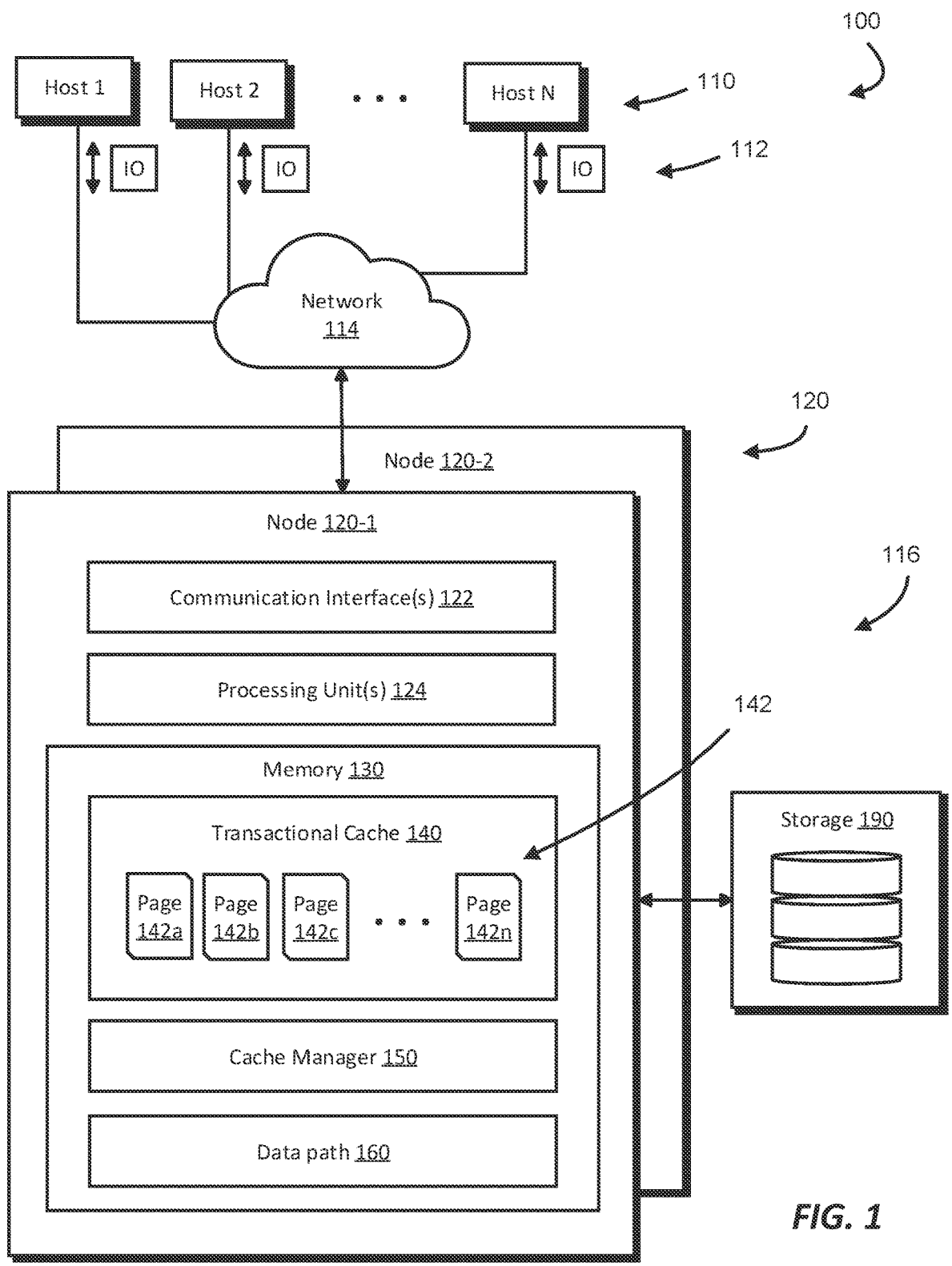
FIG. 1 is a block diagram of an example environment in which embodiments of the improved technique can be practiced.

FIG. 1 shows an example environment 100 in which embodiments of the improved technique can be practiced. Here, multiple hosts 110 are configured to access a data storage system 116 over a network 114. The data storage system 116 includes one or more nodes 120 (e.g., node 120-1 and node 120-2), and storage 190, such as magnetic disk drives, electronic flash drives, and/or the like. Nodes 120 may be provided as circuit board assemblies or blades, which plug into a chassis (not shown) that encloses and cools the nodes. The chassis has a backplane or midplane for interconnecting the nodes 120, and additional connections may be made among nodes 120 using cables. In some examples, the nodes 120 are part of a storage cluster, such as one which contains any number of storage appliances, where each appliance includes a pair of nodes 120 connected to shared storage. In some arrangements, a host application runs directly on the nodes 120, such that separate host machines 110 need not be present. No particular hardware configuration is required, however, as any number of nodes 120 may be provided, including a single node, in any arrangement, and the node or nodes 120 can be any type or types of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the node 120 using various technologies, such as Fibre Channel, iSCSI (Internet small computer system interface), NVMeOF (Non-volatile Memory Express (NVMe) over Fabrics), NFS (network file system), and CIFS (common Internet file system), for example. As is known, Fibre Channel, iSCSI, and NVMeOF are block-based protocols, whereas NFS and CIFS are file-based protocols. The node 120 is configured to receive I/O requests 112 according to block-based and/or file-based protocols and to respond to such I/O requests 112 by reading or writing the storage 190.

The depiction of node 120-1 is intended to be representative of all nodes 120. As shown, node 120-1 includes one or more communication interfaces 122, a set of processing units 124, and memory 130. The communication interfaces 122 include, for example, SCSI target adapters and/or network interface adapters for converting electronic and/or optical signals received over the network 114 to electronic form for use by the node 120-1. The set of processing units 124 includes one or more processing chips and/or assemblies, such as numerous multi-core CPUs (central processing units). The memory 130 includes both volatile memory, e.g., RAM (Random Access Memory), and non-volatile memory, such as one or more ROMs (Read-Only Memories), disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions, a transactional cache 140, a cache manager 150, and a data path 160.

Transactional cache 140 may be a metadata cache configured to manage metadata of data path 160 in pages 142 (e.g., pages 142a through 142n). Pages 142 may provide in-memory versions of blocks, where a "block" is a unit of allocatable storage space.

Cache manager 150 is configured to manage the transactional cache 140. For example, cache manager 150 is configured to receive access requests identifying certain pages 142 stored in transactional cache 140 to access as part of a transaction. The cache manager 150 is further configured to issue lock requests to limit access to certain pages 142 by other transactions. For example, the cache manager 150 may receive an access request from a cache client that identifies pages 142 to be accessed. In response, the cache manager 150 may insert lock requests into queues of some or all of the identified pages 142. The cache manager 150 is further configured to prevent insertion of lock requests under certain circumstances, as discussed in more detail below.

The cache client may be any client in electronic communication with the transactional cache 140. In some arrangements, the cache client is configured to send access requests to the transactional cache 140. For example, cache client may be a mapper in data path 160 that identifies metadata to be stored in the transactional cache 140.

Data path 160 is configured to manage metadata for accessing data of data objects, e.g., by mapping logical data to physical data. As described in more detail below, the data path 160 may include various logical blocks, mapping pointers, and block virtualization structures, for example, and may track various attributes of blocks. In an example, the data path 160 provides a predefined page ordering of pages in the transactional cache. For example, the data path 160 may include different levels of pointers, and such levels may be used at least in part in establishing the predefined page ordering. However, it should be understood that that establishing the predefined page ordering in this manner is merely an example, and the predefined page ordering may be established in other ways.

In an example operation, the hosts 110 issue I/O requests 112 to the data storage system 116. The node 120 receives the I/O requests 112 at the communication interfaces 122 and initiates further processing. Such processing may involve managing metadata that maps the location of data objects in the data storage system 116. Managing such metadata may involve storing the metadata within pages 142 in the transactional cache 140 and accessing the pages 142 in transactions managed by the cache manager 150. In some examples, prior to accessing the pages 142, the cache manager 150 issues lock requests to assign ownership of locks on the pages 142 to transactions.

Managing Locks in an Individual Storage Processing Node

Figure 2:
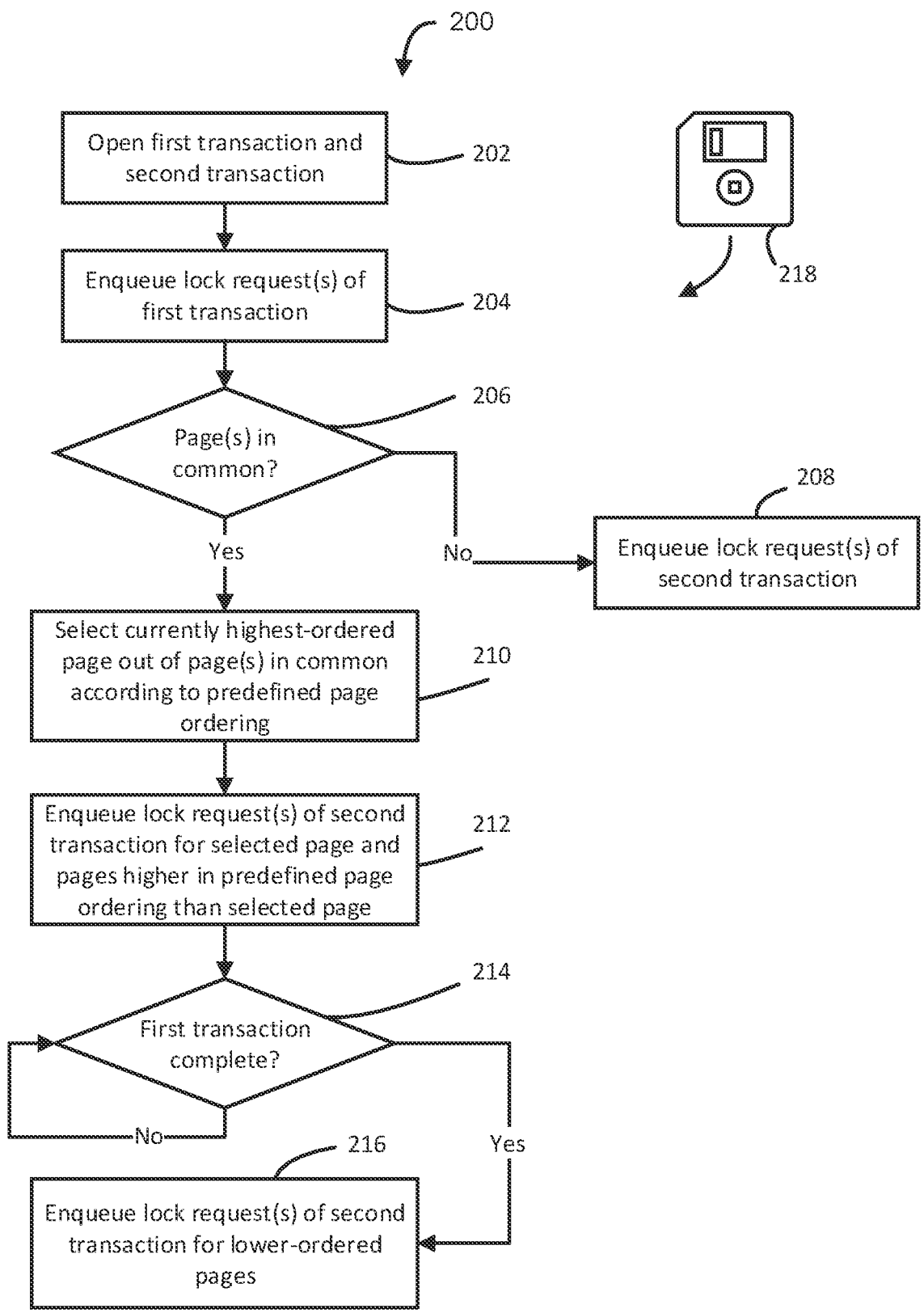
FIG. 2 is a flowchart showing example activities that may be performed in the environment of FIG. 1.

FIG. 2 shows an example method 200 that may be performed and/or directed by the cache manager 150. Method 200 provides a high-level summary of various embodiments, including embodiments that have only a single storage processing node and embodiments that have multiple nodes. In multi-node embodiments, each node is configured to manage lock requests of multiple transactions.

At 202, the cache manager 150 opens a first transaction and a second transaction. The transactions may be opened in any order or at the same time. In an example, the first transaction identifies a first plurality of pages to be accessed and the second transaction identifies a second plurality of pages to be accessed.

At 204, the cache manager 150 enqueues a set of lock requests of the first transaction. For example, the cache manager 150 may insert lock requests of the first transaction into queues of some or all of the pages in the first plurality of pages. In some examples, the cache manager 150 maintains separate queues for individual pages in the transactional cache. Enqueuing lock requests of the first transaction may occur before enqueuing lock requests of the second transaction.

At 206, the cache manager 150 determines whether the first plurality of pages and the second plurality of pages contain any pages in common. The pages in common are pages to be accessed in both the first transaction and the second transaction.

If act 206 determines that there are no pages in common, then the operation proceeds to 208, whereupon the cache manager 150 enqueues the lock requests for pages of the second transaction. For example, the cache manager 150 may insert a lock request of the second transaction into a respective queue of each of the second plurality of pages. It should be understood that if there are no pages in common between the transactions, then the second transaction can proceed without waiting for locks currently owned by the first transaction. In some examples, the lock requests of the second transaction are hard locks, rather than try locks.

If act 206 determines that there is at least one page in common, then operation proceeds to 210, whereupon the cache manager 150 selects a currently highest-ordered page from the at least one page in common according to a predefined page ordering. The selected page is also referred to herein as a "target" page.

The predefined page ordering is an ordered arrangement of pages and provides a common reference between transactions when selecting lock requests to issue. For example, the first transaction and the second transaction may identify multiple pages in common including a first page and a second page. By referencing the predefined page ordering, the cache manager 150 may determine that the first page is higher ordered than the second page, and as a result, the cache manager 150 selects the first page as the target page to lock.

In some arrangements, the predefined page ordering is based on page addressing provided by a cache client, e.g., a mapper. However, using page addressing to determine the predefined page ordering is merely an example, and other arrangements are possible. For example, pages may be ordered randomly, ordered according to page access rates, or ordered in some other manner. In some arrangements, pages in the transactional cache are assigned respective indicators of the predefined page ordering.

The term "highest-ordered" refers to placement of a page relative to other pages in a predefined page ordering. It should be understood that the placement of a page may differ based on how the predefined page ordering is defined. For example, when performing the above-described act 210, a first page with a lower page address may be selected over a second page with a higher page address. In this example, the first page is in fact the highest-ordered page out of the first and second pages, even though the first page has a lower page address. Similar variations may be made without departing from the scope of the invention.

At 212, the cache manager 150 enqueues lock requests of the second transaction for the target page and any pages higher in the predefined page ordering than the target page. In some arrangements, these lock requests are hard locks, rather than try locks.

In some arrangements, the second transaction involves accessing one or more lower-ordered pages that are lower in the predefined page ordering than the target page. In such cases, while the first transaction is open, the cache manager 150 prevents insertion of lock requests of the second transaction into queues of the lower-ordered pages. For example, cache manager 150 may place a hold on issuing lock requests of the second transaction for the lower-ordered pages. While the hold is in place, the cache manager 150 will refrain from issuing lock requests of the second transaction for the lower-ordered pages. The lower-ordered pages may include pages in common between the first transaction and the second transaction, as well as pages other than the pages in common.

Advantageously, because the cache manager 150 prevents lock requests of the second transaction for the lower-ordered pages from being enqueued, the second transaction will not provide an opportunity for deadlock to occur on those pages. As a result, lock requests of the first transaction may be enqueued without needing to calculate potential deadlock conflicts with the second transaction. For example, after placing a hold, the cache manager 150 may receive a new access request that identifies the lower-ordered pages as pages to be accessed in the first transaction. The cache manager 150 may immediately issue lock requests of first transaction for these pages without first needing to calculate potential deadlock conflicts with the second transaction. In this manner, these features enable an improvement to the utilization of processor resources and an improvement to response time when servicing access requests. Further, these lock requests may be hard locks, rather than try locks.

At 214, the cache manager 150 monitors a completion status of the first transaction. In some arrangements, the cache manager 150 waits for the first transaction to complete. Once act 214 detects that the first transaction has completed, the operation proceeds to 216, whereupon the cache manager 150 enqueues lock requests of the second transaction for the lower-ordered pages. In some examples, these lock requests are hard locks, rather than try locks.

Advantageously, method 200 enables a reduction in the use of try locks over conventional approaches that allow only one hard lock per transaction. As described above, a try lock is one that is granted if a target page is immediately available but otherwise fails. Although failed try locks can be retried, repetitive use of try locks may result in wasted processor resources. Using method 200, cache manager 150 may enqueue multiple hard locks in each transaction without increasing the risk of deadlock. As a result, method 200 enables fewer try locks to be issued, increasing utilization of processor resources.

Figure 3:
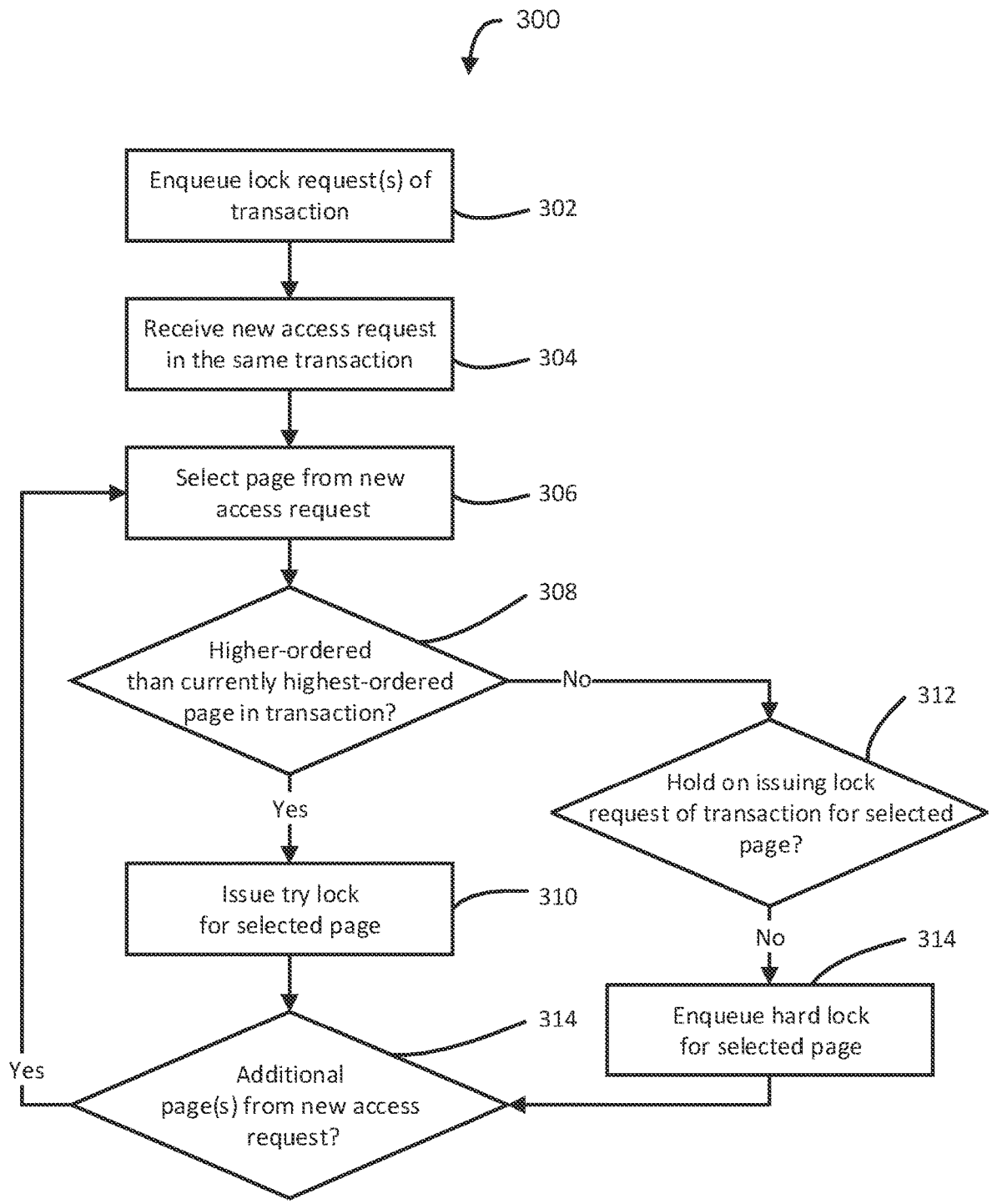
FIG. 3 is a flowchart showing example activities that may be performed in the environment of FIG. 1.

FIG. 3 shows an example method 300 that may be performed and/or directed by the cache manager 150. Method 300 is directed to servicing access requests received after a lock request has already been enqueued for a transaction. Method 300 may be performed in conjunction with method 200, described above.

At 302, the cache manager 150 enqueues a set of lock requests of a transaction. Act 302 may be any of acts 204, 208, 212, 216, and the like. For example, the cache manager 150 may receive a first access request that identifies pages to access in a transaction. In response to receiving the first access request, the cache manager 150 may insert lock requests of the transaction into respective queues of the identified pages.

At 304, after enqueuing the lock requests, the cache manager 150 receives a new access request in the same transaction. The new access request identifies a set of new pages to be accessed in the transaction.

At 306, the cache manager 150 selects a page identified in the new access request. The selected page may be, for example, the highest-ordered page out of the set of new pages according to a predefined page ordering. In some arrangements, the predefined page ordering is the same page ordering as the one described in connection with method 200.

At 308, the cache manager 150 determines whether the selected page is higher in the predefined page ordering than the highest-ordered page identified by the transaction prior to receiving the new access request. For example, the cache manager 150 may compare the pages identified in a prior access request with pages identified in the new access request.

If act 308 determines that the selected page is higher in the predefined page ordering than the currently highest-ordered page, then the operation proceeds to 310, whereupon the cache manager 150 issues a try lock for the selected page in the transaction.

If act 308 determines that the selected page is not higher in the predefined page ordering than the currently highest-ordered page, then the operation proceeds to 312, whereupon the cache manager 150 determines whether it is prevented from inserting lock requests of the transaction into a queue of the selected page. In some arrangements, the cache manager 150 identifies a hold that prevents insertion of such a lock request, e.g., a hold described above in connection with act 212 of method 200.

If act 312 determines that the cache manager 150 is not prevented from inserting a lock request of the transaction into a queue of the selected page, then the operation proceeds to 314, whereupon the cache manager 150 enqueues a hard lock for the selected page in the transaction.

At 316, the cache manager 150 determines whether the new access request identifies any additional pages, and if so, the operation proceeds back to 306, whereupon the cache manager 150 selects another page identified in the new access request. Method 300 may proceed until each of the pages in the new access request are enqueued.

Advantageously, in conjunction with method 200, method 300 enables improved utilization of processor resources while avoiding deadlock. In some arrangements, both methods 200 and 300 utilize the same predefined page ordering to select the types of lock requests to issue. In accordance with method 200, the cache manager 150 may use the predefined page ordering to prevent insertion of lock requests of an earlier transaction into queues of certain pages, denying an opportunity for the earlier transaction to cause deadlock to occur on those pages. Subsequently, in accordance with method 300, the cache manager 150 may receive an access request in a later transaction identifying the certain pages. As described, the cache manager 150 may issue lock requests of the later transaction for the certain pages without first needing to calculate potential deadlock conflicts with the earlier transaction. In this manner, these features enable an improvement to the utilization of processor resources and an improvement to response time when servicing access requests. Further, these lock requests may be hard locks, enabling fewer try locks to be issued.

FIG. 4a through FIG. 4e (collectively referred to as FIG. 4) show an example arrangement for managing locks in a transactional cache utilizing methods 200 and 300. FIG. 4 includes transactional cache 140 that stores pages 142a through 142d. In an example, each of pages 142a through 142d has respective queues 444a through 444d in which lock requests may be inserted. When a transaction completes, locks owned by the transaction are released.

Figure 4A:
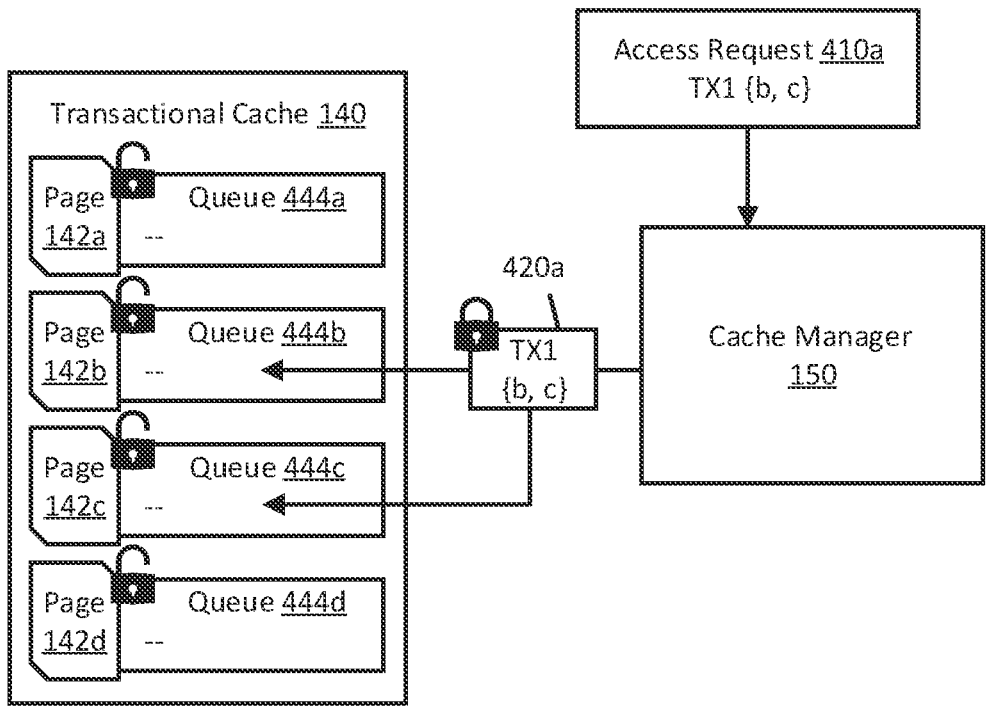
FIG. 4a through FIG. 4e are block diagrams showing an example arrangement in which a single storage node manages access to pages in a transactional cache system.

In FIG. 4a, the cache manager 150 receives a first access request 410a that identifies pages 142b and 142c to be accessed in a first transaction (as shown as "TX1"). The cache manager 150 issues command 420a to insert lock requests into respective queues 444b and 444c. As there are currently no enqueued locks for pages 142b and 142c, the cache manager 150 may immediately assign ownership of the lock on pages 142b and 142c to the first transaction.

Figure 4B:
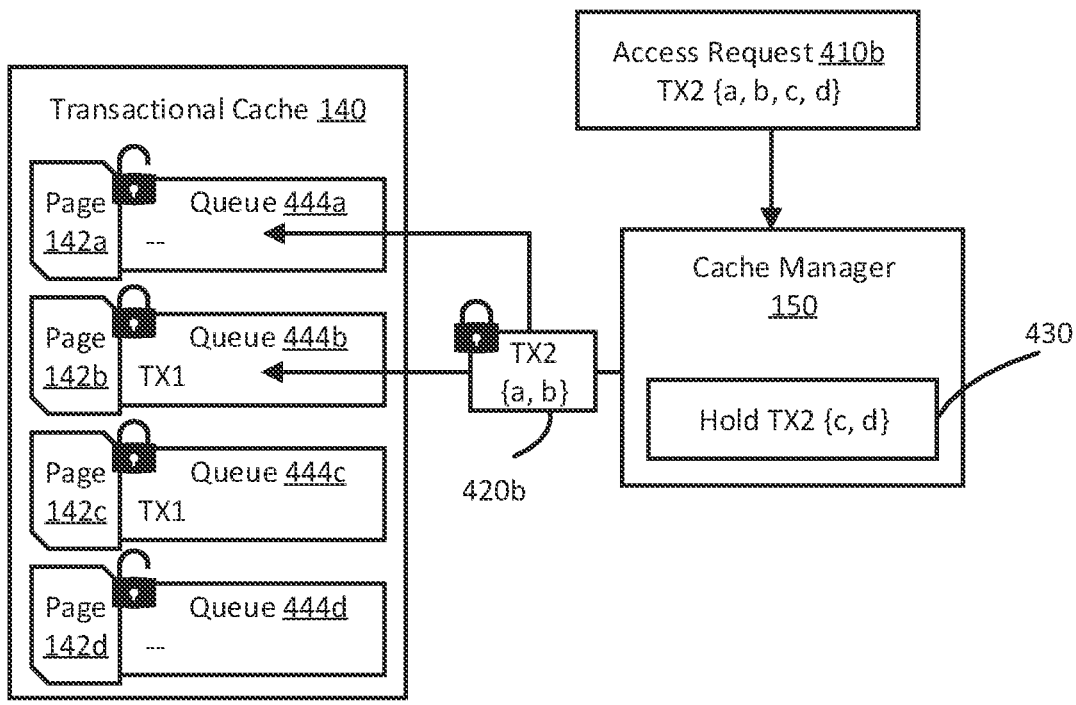

In FIG. 4b, the cache manager 150 receives a second access request 410b that identifies pages 142a through 142d to be accessed in a second transaction (as shown as "TX2"). However, because both the first transaction and the second transaction identify pages 142b and 142c to be accessed, pages 142b and 142c are pages in common between the transactions. As a result, the cache manager 150 selects the highest-ordered page from among the pages in common according to a predefined page ordering. In this example, suppose that the predefined page ordering places page 142a higher than page 142b, page 142b higher than page 142c, and page 142c higher than page 142d. The cache manager 150 thus selects page 142b as the highest-ordered page out of the pages in common (pages 142b and 142c).

The cache manager 150 then enqueues a lock request of the second transaction for the selected page (page 142b) behind the lock request of the first transaction. The cache manager 150 further places a hold 430 on pages 142c and 142d, as they are lower in the predefined page ordering than the selected page.

Note that the second access request 410b also identifies page 142a that (1) is not one of the pages in common and (2) is higher in the predefined page ordering than the pages in common. As explained in further detail below in connection with FIG. 4c, a lock request for page 142a may be inserted without causing deadlock. As a result, the cache manager 150 issues command 420b to insert lock requests into respective queues 444a and 444b. Both lock requests are hard locks that are enqueued regardless of whether another transaction has ownership of locks on the respective pages.

Figure 4C:
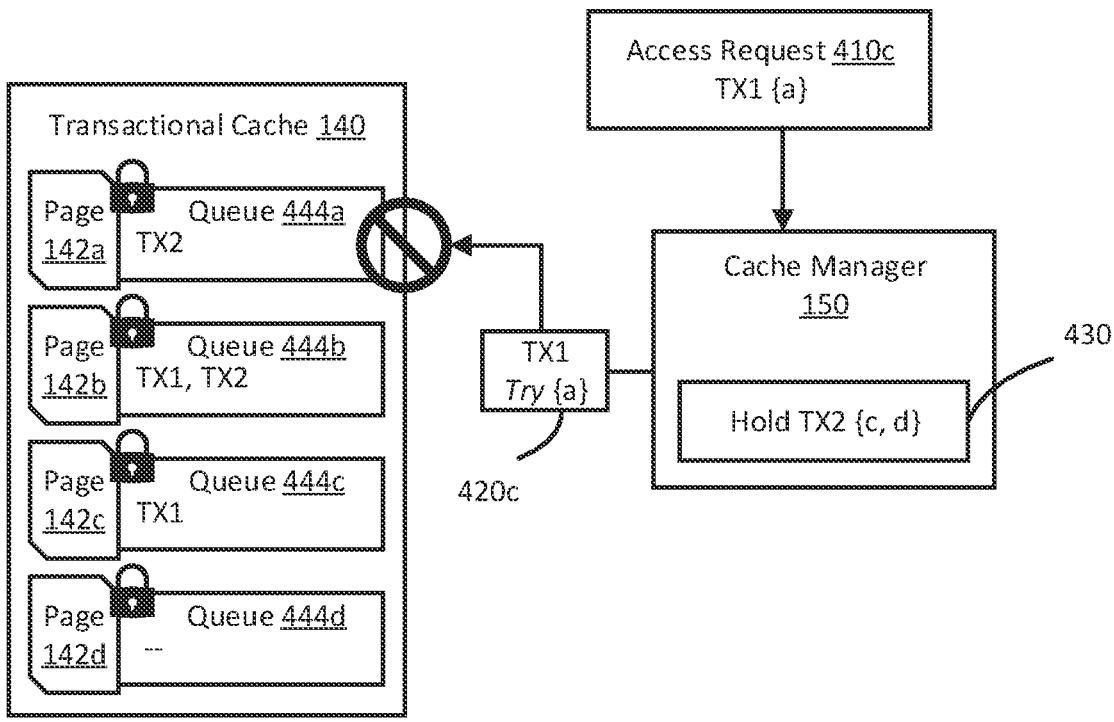

In FIG. 4c, the cache manager 150 receives a third access request 410c that identifies page 142a to be accessed in the first transaction. In this example, page 142a is higher in the predefined page ordering than the pages for which locks have been enqueued in the first transaction (pages 142b and 142c). As a result, the cache manager 150 issues a command 420c to insert a try lock for page 142a. As a conflicting lock request is already enqueued, the try lock fails.

Advantageously, use of the predefined page ordering enables deadlock to be avoided. Note that denying the try lock means that the first transaction does not wait behind the second transaction for page 142a while the second transaction waits behind the first transaction for page 142b. In this manner, deadlock does not occur because the second transaction does not block the first transaction from completing and vice versa.

Figure 4D:
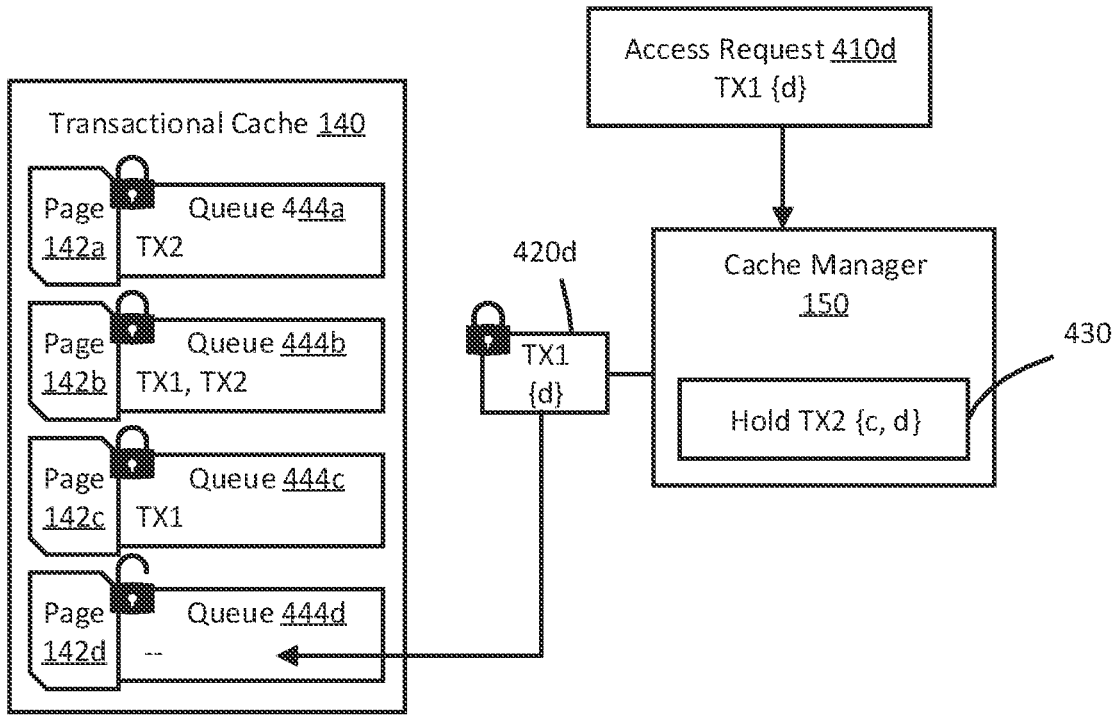

In FIG. 4d, the cache manager 150 receives a fourth access request 410d that identifies page 142d to be accessed in the first transaction. In this example, page 142d is lower in the predefined page ordering than the pages for which locks have been enqueued in the first transaction (pages 142b and 142c). As a result, the cache manager 150 issues a command 420c to insert a hard lock for page 142d.

Figure 4E:
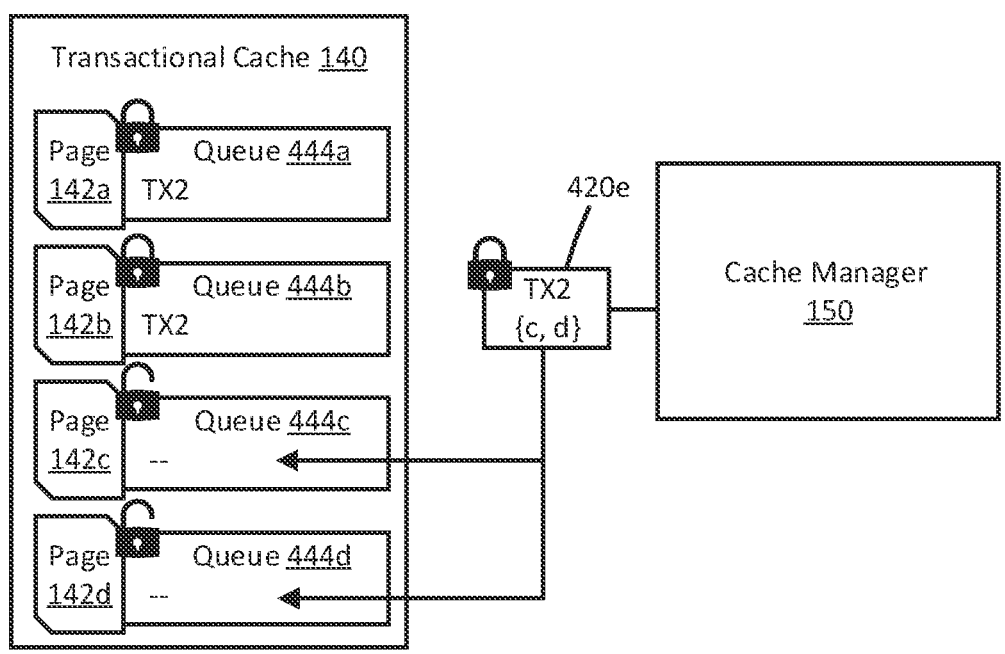

In FIG. 4e, the first transaction has completed and the locks owned by the first transaction have been removed from the queues of the respective pages (queues 444b, 444c, and 444d). Afterwards, the cache manager 150 lifts the hold 430 on pages 142c and 142d and issues command 420e to insert lock requests into respective queues 444c and 444d. The second transaction thus obtain ownership of the locks on pages 142c and 142d.

Managing Locks in Multiple Storage Processing Nodes

Figure 5A:
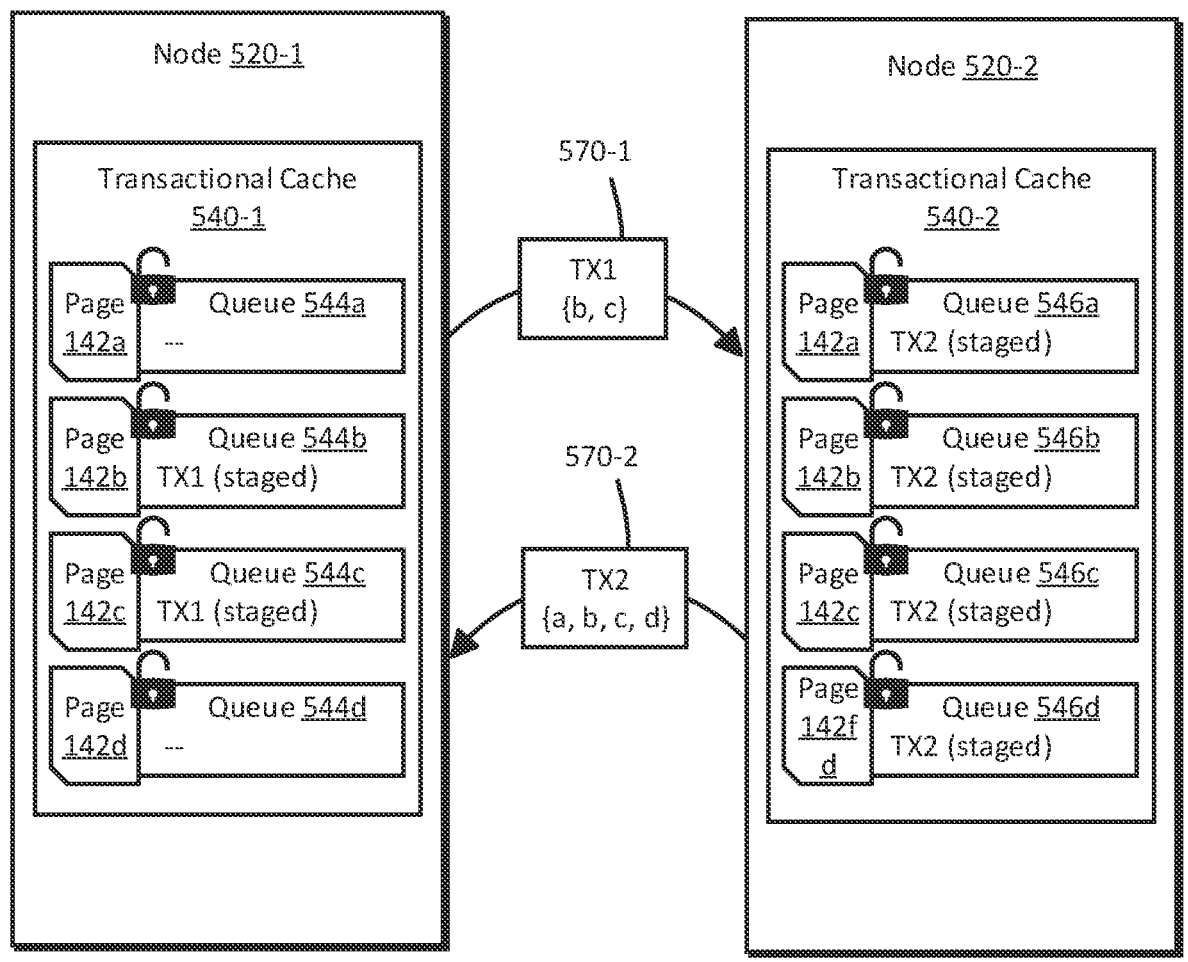
FIG. 5a through FIG. 5b are block diagrams showing an example arrangement in which multiple storage nodes manage access to pages in a transactional cache system.
Figure 5B:
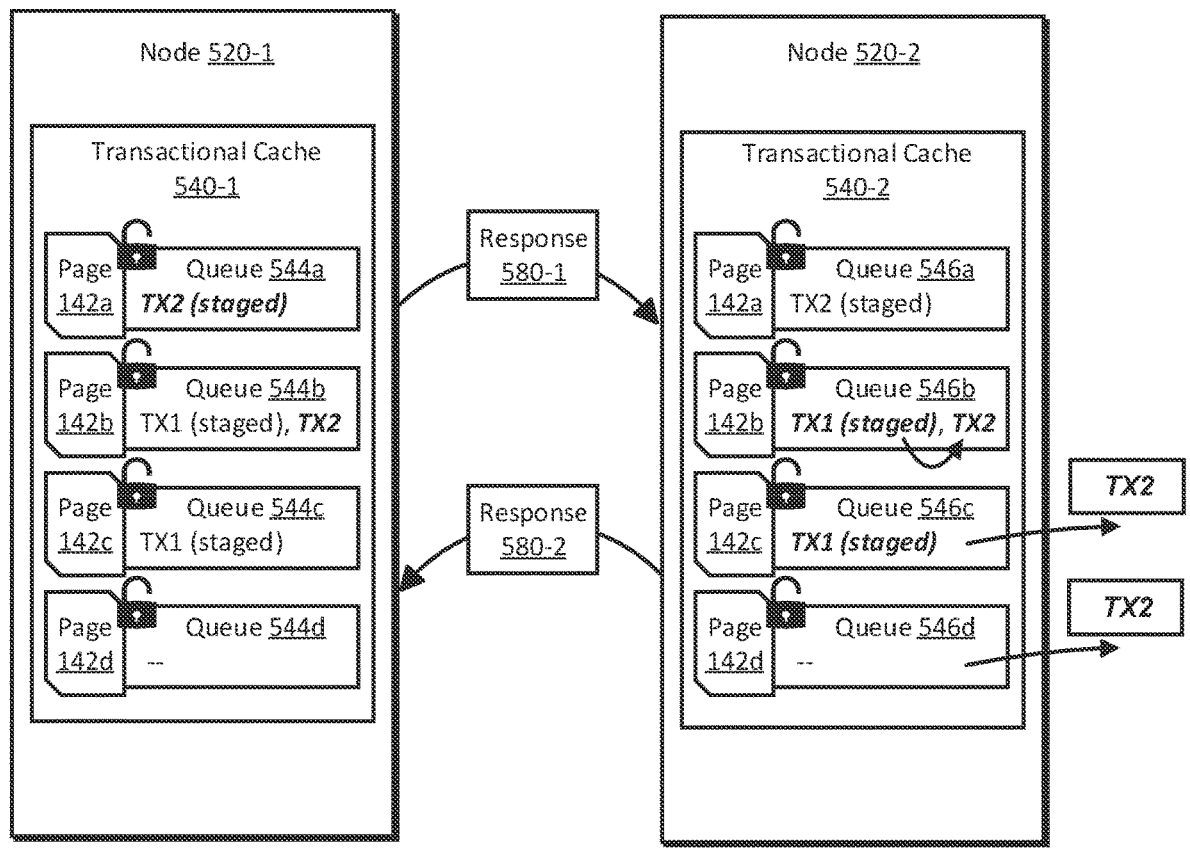

FIG. 5a and FIG. 5b (collectively referred to as FIG. 5) show an example arrangement in which multiple storage processing nodes manage locks in a transactional cache. In the example arrangement, nodes have shared access to a transactional cache. Further, each node maintains its own queues of pages in the transactional cache and may insert lock requests into its queues independently from other nodes. For example, a first node may open a first transaction and insert a lock request into a queue managed by the first node for a page in the transactional cache. Simultaneously, a second node may open a second transaction and insert a conflicting lock request into a queue managed by the second node for the same page. However, although conflicting lock requests may be enqueued in different nodes at the same time, a transaction cannot own a lock that conflicts with a lock owned by another transaction. As addressed at least in part herein, there is a need to resolve such conflicts prior to granting ownership of a lock to a transaction.

The example arrangement uses a concept called "staging" to resolve conflicts. A lock request is considered "staged" when the lock request reaches the head of a queue of a target page while the target page is unlocked. In some examples, after a node stages a lock request, the node then sends a peer permission request to other nodes (also referred to as "peer nodes") that are capable of accessing the target page. The peer permission request identifies a transaction and pages to be accessed in the transaction and enables the nodes to identify and resolve any potential conflicts. As a result, the nodes may resolve conflicts prior to locking the pages while the lock requests are staged, rather than immediately granting the lock requests and potentially causing deadlock to occur.

In FIG. 5, nodes 520-1 and 520-2 collectively manage access to pages 142a through 142d in transactional cache 540 (as shown as transactional cache 540-1 and transactional cache 540-2). Node 520-1 manages queues 544a through 544d corresponding to respective pages 142a through 142d. Similarly, node 520-2 manages queues 546a through 546d corresponding to the same respective pages.

In FIG. 5a, node 520-1 inserts lock requests of a first transaction (as shown as "TX1") into respective queues 544b and 544c. As the lock requests are at the heads of their respective queues while the pages are unlocked, the lock requests are considered staged. Likewise, node 520-2 inserts lock requests of a second transaction (as shown as "TX2") into respective queues 546a through 546d, and these lock requests are considered staged.

After staging the lock requests, each node sends a peer permission request to the other node (e.g., using communication interfaces 122). In an example, node 520-1 sends peer permission request 570-1 to node 520-2, which identifies staged pages 142b and 142c to be locked in the first transaction. Similarly, node 520-2 sends peer permission request 570-2 to node 520-1, which identifies staged pages 142a through 142d to be locked in the second transaction. It should be understood that FIG. 5 is an example arrangement and any number of additional nodes (not shown) may access to the same set of pages 142a through 142d. In such circumstances, the peer permission requests 520-1 and 520-2 may also be sent to each of the additional nodes.

Upon receiving the peer permission requests, the nodes 520-1 and 520-2 resolve potential deadlock conflicts based on a "primary wins" scheme. Under this scheme, one node is designated as the "primary" node and the other node is designated as the "secondary" or "non-primary" node. Staged lock requests identified by the primary node have priority over staged lock requests identified by the secondary node. Primary and non-primary designations may be assigned at a variety of different times, e.g., at startup, after a predetermined time interval, upon discovering a potential deadlock conflict, and so forth. Further, the nodes may assign designations in a variety of different manners, e.g., randomly, according to node characteristics, and so forth.

In FIG. 5b, node 520-1 has been designated as the primary node while node 520-2 has been designated as the secondary node. As a result, the staged lock requests of the first transaction opened by node 520-1 have priority over the staged lock requests of the second transaction opened by node 520-2.

Note that methodologies used to manage deadlock in an individual node may still apply in a multi-node setting. For example, node 520-1 receives peer permission request 570-2 identifying pages 142a through 142d to be locked in the second transaction. However, node 520-1 has already enqueued lock requests of the first transaction for pages 142b and 142c, meaning pages 142b and 142c are pages in common between the first transaction and the second transaction. As a result, node 520-1 performs a process similar to the one described above in connection with FIG. 4b. Along these lines, node 520-1 selects page 142b as a target page that is highest in the predefined page ordering out of the pages in common. Node 520-1 further identifies pages 142a as a page higher in the predefined page ordering than the target page. As a result, node 520-1 enqueues lock requests of the second transaction for pages 142a and 142b and prevents insertion of lock requests of the second transaction for pages lower in the predefined page ordering than the target page (pages 142c and 142d). Node 520-1 then sends response 580-1 to node 520-2 indicating queue changes.

Likewise, in node 520-2, lock requests from the primary node are enqueued before lock requests from the secondary node (lock requests of the first transaction are staged in queues 546b and 546c). Following methodologies used to manage deadlock in a single node, node 520-2 removes lock requests of the second transaction from queues 546c and 546d. Node 520-2 then sends response 580-2 to node 520-1 indicating queue changes.

Figure 6A:
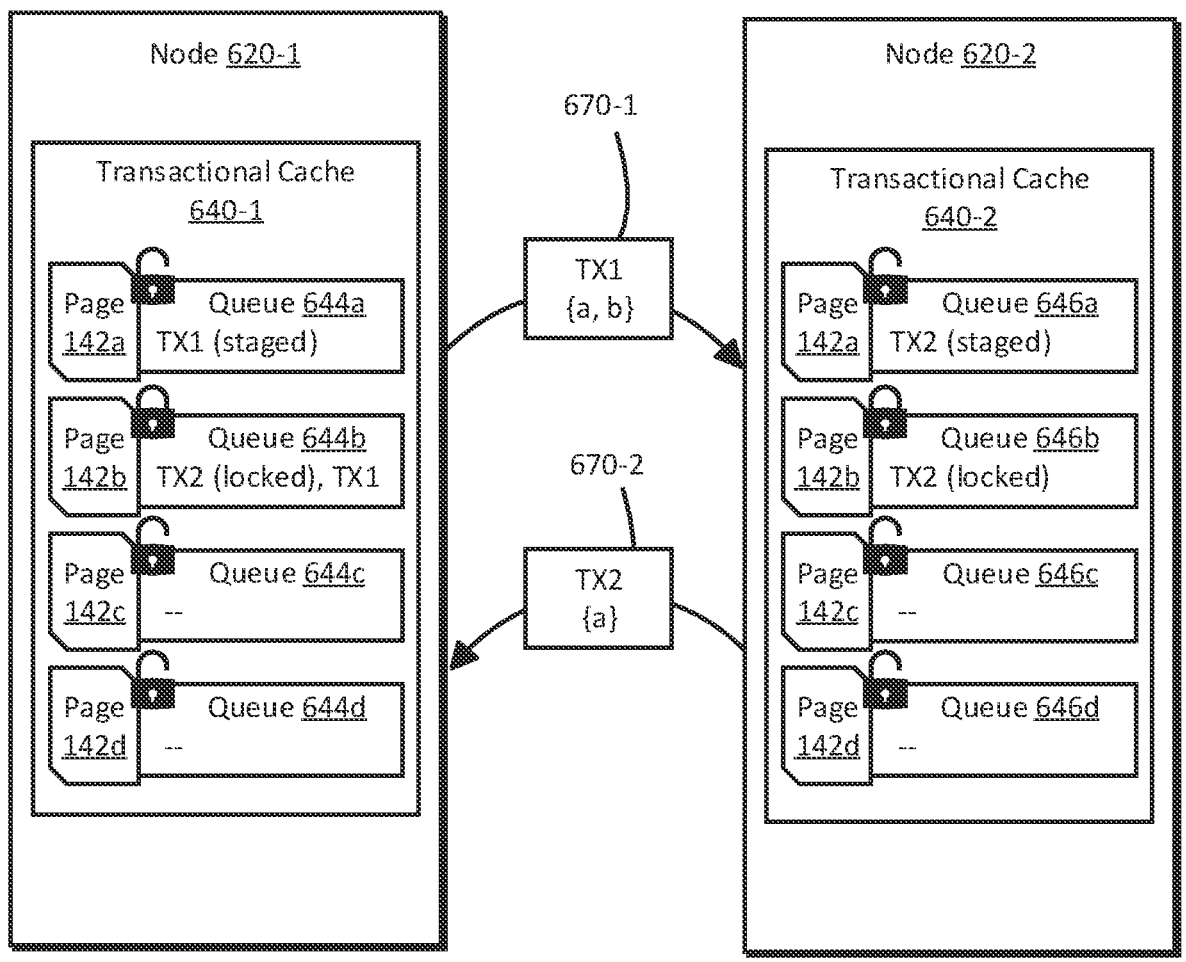
FIG. 6a through FIG. 6b are block diagrams showing an example arrangement in which multiple storage nodes manage access to pages in a transactional cache system.
Figure 6B:
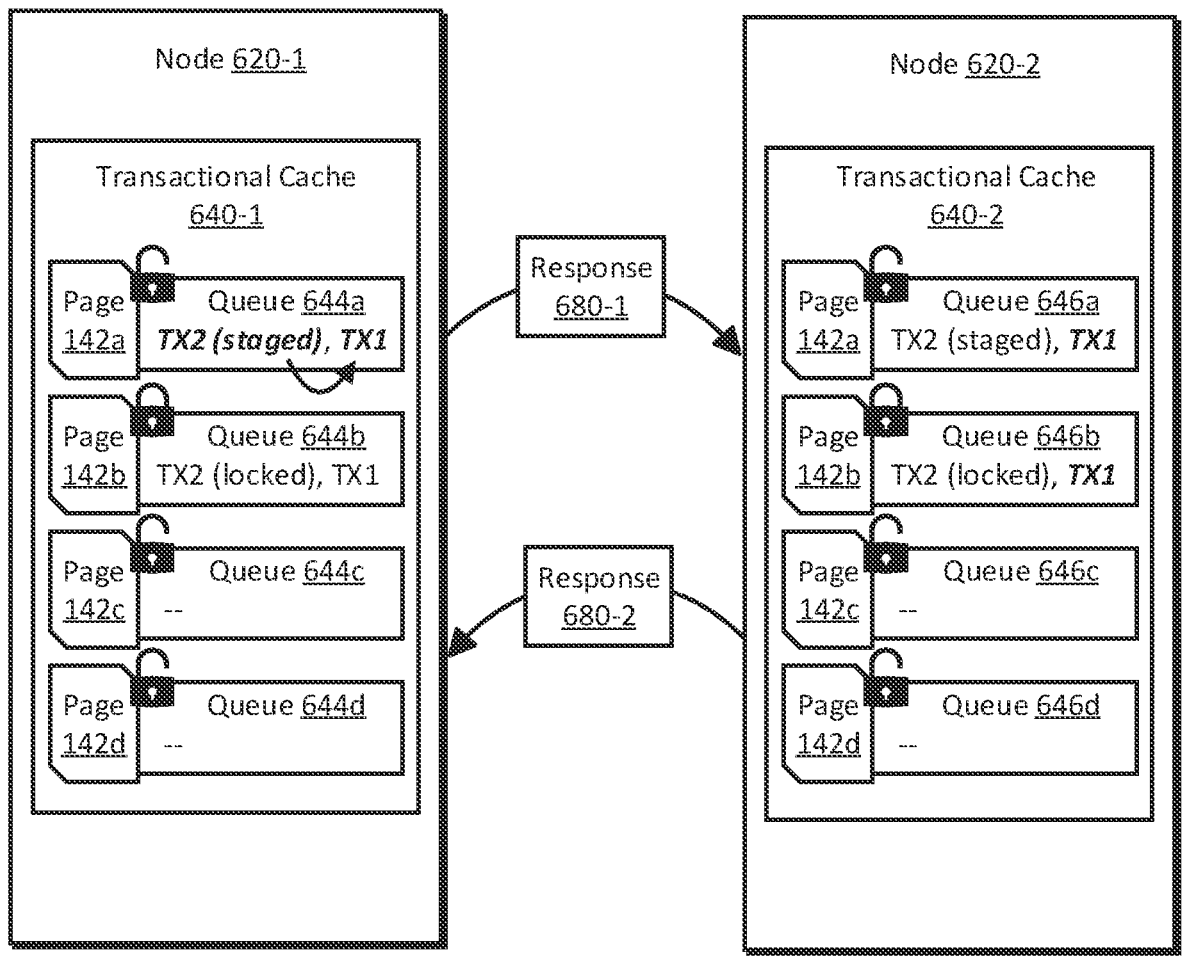

FIG. 6a and FIG. 6b (collectively referred to as FIG. 6) show an example arrangement of an exception to the "primary wins" scheme described above in connection with FIG. 5. This exception arises when a particular transaction already owns a lock on a first page and then the nodes stage conflicting lock requests for a second page. In such circumstances, deadlock may be avoided by giving priority to the particular transaction to obtain a lock on the second page, regardless of whether the particular transaction was opened by the primary node.

In FIG. 6, nodes 620-1 and 620-2 collectively manage access to pages 142a through 142d in transactional cache 640 (as shown as transactional cache 640-1 and transactional cache 640-2). Additionally, node 620-1 manages queues 644a through 644d corresponding to respective pages 142a through 142d. Likewise, node 620-2 manages queues 646a through 646d corresponding to the same respective pages.

In this example, primary node 620-1 opens a first transaction (as shown as "TX1") and secondary node 620-2 opens a second transaction (as shown as "TX2"). Further, the second transaction obtains a lock on page 142b. Later, node 620-1 inserts lock requests of a first transaction for pages 142a and 142b into corresponding queues 644a and 644c. Additionally, node 620-2 inserts a lock request of a second transaction for page 142a into corresponding queue 646a. Node 620-1 then sends peer permission request 670-1 to node 620-2, identifying pages 142a and 142a to be locked in the first transaction. Likewise, node 620-2 sends peer permission request 670-2 to node 620-1, identifying page 142c to be locked in the second transaction.

As the second transaction already owns a lock on a page in the transactional cache, the second transaction has priority to obtain locks regardless of whether the transaction was opened by the secondary node. As a result, in FIG. 6b, node 620-1 de-stages the lock request of the first transaction in queue 644a and stages a lock request of the second transaction in the same queue. Node 620-1 then sends response 680-1 to node 620-2 indicating queue changes. Similarly, node 620-2 enqueues lock requests of the first transaction in queues 646a and 646b. Node 620-2 then sends response 680-2 to node 620-1 indicating queue changes. In this manner, deadlock does not occur because the second transaction does not block the first transaction from completing and vice versa.

Figure 7:
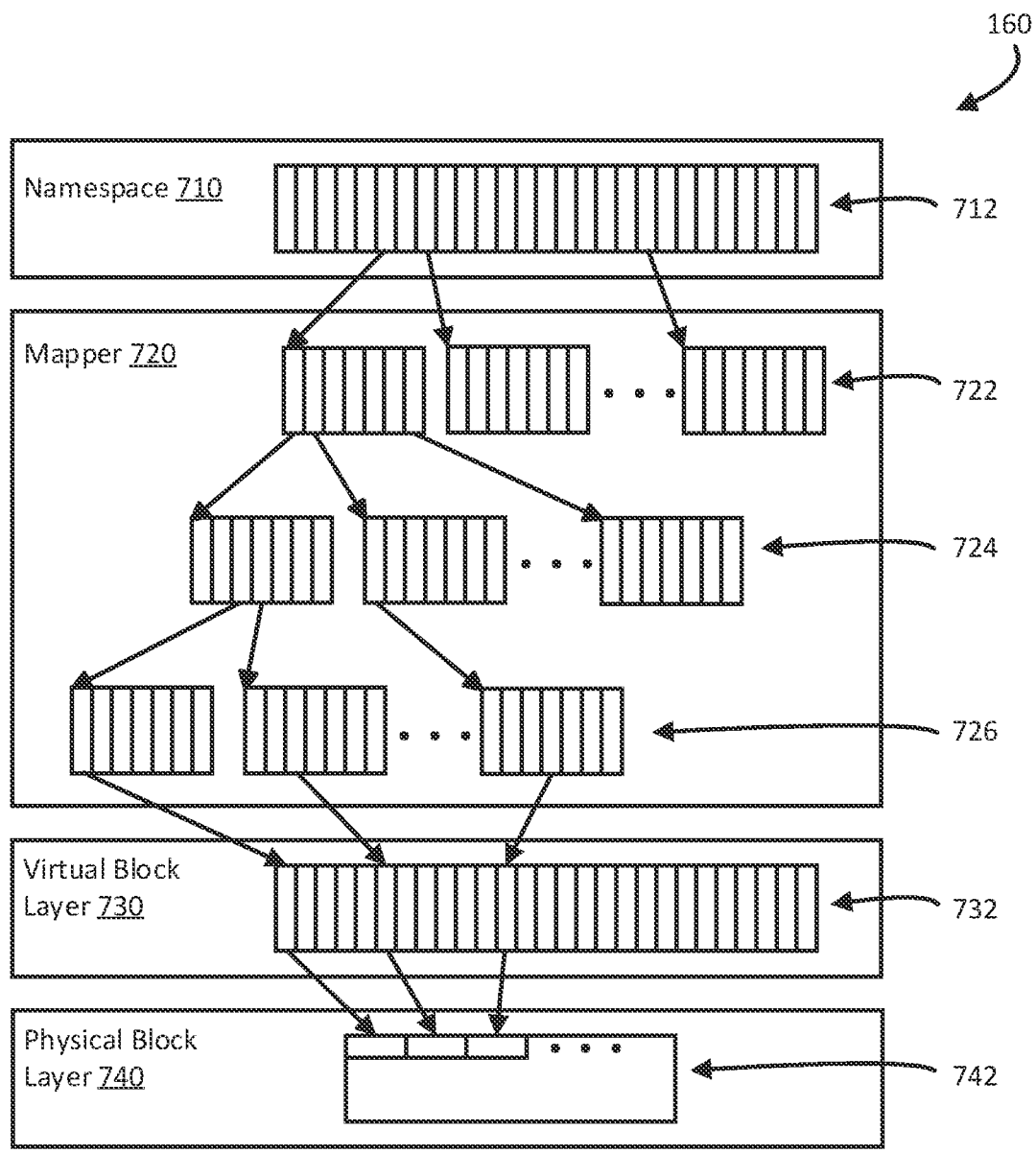
FIG. 7 is a block diagram of an example data path from which a predefined page ordering may be generated.

FIG. 7 shows an example data path 160 of FIG. 1 in greater detail. The data path 160 provides an arrangement of metadata used for accessing data in the data storage system 116. In some examples, the data path 160 may be used to provide a predetermined page ordering of pages in the transactional cache 140.

As shown, the data path 160 includes a namespace 710, a mapping structure 720 (a "mapper"), a virtual block layer 730, and a physical block layer 740. The namespace 710 is configured to organize logical data, such as that of LUNs, file systems, virtual machine disks, snapshots, clones, and the like. In an example, the namespace 710 provides a large logical address space and is denominated in blocks 712. The mapper 720 is configured to point logical blocks 712 in the namespace 710 to respective descriptors 732 of virtual blocks in the virtual block layer 730. The mapper 720 may include multiple levels of pointers, such as tops 722, mids 724, and leaves 726, which together are capable of mapping large amounts of data. The virtual block layer 730 provides a level of indirection between the mapper 720 and the physical block layer 740, allowing physical blocks to be moved without disturbing pointers in the mapper 720. Physical blocks 742 in the physical block layer 740 are typically compressed.

In an example, the multiple levels of pointers in mapper 720 may provide a predefined page ordering used selectively insert lock requests into queues of a transactional cache. In an example, tops 722 are higher in the predefined page ordering than mids 724, and mids 724 are higher in the predefined page ordering than leaves 726. Further, pointers within a particular level may provide more specific page ordering. For example, a first pointer within tops 722 may be higher than second pointer within tops 722. Ordering pointers within a level may be performed in a variety of different manners, e.g., using indicators assigned to the pointers, offset locations within a level, and so forth. It should be understood that using the levels in mapper 720 to generate a predefined page ordering is merely an example and different manners of generating a predefined page ordering are possible.

An improved technique has been described for managing locks in a transactional cache. The technique includes opening, in the transactional cache, a first transaction identifying a first plurality of pages to be accessed and a second transaction identifying a second plurality of pages to be accessed, where the first plurality of pages has at least one page in common with the second plurality of pages. The technique further includes, after opening the first transaction and the second transaction, selecting a target page that is highest in the predefined page ordering out of the at least one page in common, where second plurality of pages includes a lower-ordered page that is lower in the predefined page ordering than the target page. The technique further includes, while the first transaction is open, inserting a first lock request of the second transaction into a queue of the target page and preventing insertion of a second lock request of the second transaction into a queue of the lower-ordered page.

Having described certain embodiments, numerous alternative embodiments or variations can be made. For example, although some arrangements have been described with reference to pages 142*a* through 142*d*, these pages are merely an example. Other embodiments may include more or fewer pages or other storage objects. Similarly, although some arrangements have been described with reference to a first transaction and a second transaction, more or fewer transactions may be opened by the same or different nodes.

Also, although embodiments have been described that involve one or more data storage systems, other embodiments may involve computers, including those not normally regarded as data storage systems. Such computers may include servers, such as those used in data centers and enterprises, as well as general purpose computers, personal computers, and numerous devices, such as smart phones, tablet computers, personal data assistants, and the like.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 218 in FIG. 2). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should be interpreted as meaning "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of managing locks in a transactional cache, comprising:
   opening, in the transactional cache, (i) a first transaction that identifies a first plurality of pages to be accessed and (ii) a second transaction that identifies a second plurality of pages to be accessed, the first plurality of pages having at least one page in common with the second plurality of pages;
   after opening the first transaction and the second transaction, selecting a target page that is highest in a predefined page ordering out of the at least one page in common, the second plurality of pages including a lower-ordered page that is lower in the predefined page ordering than the target page; and
   while the first transaction is open, (i) inserting a first lock request of the second transaction into a queue of the target page and (ii) preventing insertion of a second lock request of the second transaction into a queue of the lower-ordered page.

2. A method of claim 1, further comprising:
   after completing the first transaction, inserting the second lock request of the second transaction into the queue of the lower-ordered page.

3. A method of claim 2, wherein inserting the first lock request includes issuing the first lock request as a first blocking lock request that is enqueued regardless of whether another transaction has ownership of a lock on the target page; and
   wherein inserting the second lock request includes issuing the second lock request as a second blocking lock request.

4. A method of claim 2, wherein the lower-ordered page is one of multiple lower-ordered pages of the second plurality of pages, the lower-ordered pages being lower in the predefined page ordering than the target page; and
wherein the method further includes:
generating a command that identifies multiple lock requests of the second transaction for the lower-ordered pages; and
after completing the first transaction, issuing the command to insert the multiple lock requests into respective queues of the lower-ordered pages.

5. A method of claim 1, further comprising:
inserting a blocking lock request of the first transaction into a queue of a first page; and
after inserting the blocking lock request, issuing a non-blocking lock request of the first transaction for a second page that is higher in the predefined page ordering than the first page.

6. A method of claim 1, wherein inserting the first lock request includes issuing the first lock request as a first blocking lock request; and
wherein the method further comprises, while the first transaction is open, inserting a second blocking lock request of the second transaction into a queue of a page that (i) is not included in the at least one page in common and (ii) is higher in the predefined page ordering than the at least one page in common.

7. A method of claim 1, wherein opening the first transaction is performed by a first node and opening the second transaction is performed by a second node, the first node and the second node being storage processors; and
wherein the method further comprises:
staging, by the first node, a first lock request of the first transaction in a first queue of a particular page from the at least one page in common, wherein staging the first lock request includes placing the first lock request at a front of the first queue; and
staging, by the second node, a second lock request of the second transaction in a second queue of the particular page.

8. A method of claim 7, further comprising:
after staging the first lock request and the second lock request, receiving, by the second node, a peer permission request from the first node, the peer permission request to obtain permission to grant the first lock request; and
in response to receiving the peer permission request, (i) de-staging, by the second node, the second lock request in the second queue and (ii) staging, by the second node, the first lock request in the second queue.

9. A method of claim 7, wherein the at least one page in common further includes a second particular page; and
wherein both staging the first lock request and staging the second lock request occur while the second transaction owns a lock on the second particular page.

10. A method of claim 9, further comprising:
after staging the first lock request, receiving, by the first node, a peer permission request from the second node, the peer permission request to obtain permission to grant the second lock request; and
in response to receiving the peer permission request, (i) de-staging, by the first node, the first lock request in the first queue and (ii) staging, by the first node, the second lock request in the first queue.

11. A method of claim 1, wherein the predefined page ordering is based on multiple levels of a tree structure for mapping a logical address space to a physical address space, pages in a first level of the tree structure being higher in the predefined page ordering than pages in a second level of the tree structure.

12. A method of claim 11, wherein the tree structure includes levels of top pages, middle pages, and leaf pages.

13. A computerized apparatus, comprising control circuitry that includes a set of processors coupled to memory, the control circuitry constructed and arranged to:
open, in the transactional cache, (i) a first transaction that identifies a first plurality of pages to be accessed and (ii) a second transaction that identifies a second plurality of pages to be accessed, the first plurality of pages having at least one page in common with the second plurality of pages;
after opening the first transaction and the second transaction, select a target page that is highest in a predefined page ordering out of the at least one page in common, the second plurality of pages including a lower-ordered page that is lower in the predefined page ordering than the target page; and
while the first transaction is open, (i) insert a first lock request of the second transaction into a queue of the target page and (ii) prevent insertion of a second lock request of the second transaction into a queue of the lower-ordered page.

14. A computerized apparatus of claim 13, wherein the control circuitry is further constructed and arranged to:
after completing the first transaction, insert the second lock request of the second transaction into the queue of the lower-ordered page.

15. A computerized apparatus of claim 14, wherein inserting the first lock request includes issuing the first lock request as a first blocking lock request that is enqueued regardless of whether another transaction has ownership of a lock on the target page; and
wherein inserting the second lock request includes issuing the second lock request as a second blocking lock request.

16. A method of claim 14, wherein the lower-ordered page is one of multiple lower-ordered pages of the second plurality of pages, the lower-ordered pages being lower in the predefined page ordering than the target page; and
wherein the control circuitry is further constructed and arranged to:
generate a command that identifies multiple lock requests of the second transaction for the lower-ordered pages; and
after completing the first transaction, issue the command to insert the multiple lock requests into respective queues of the lower-ordered pages.

17. A computerized apparatus of claim 13, wherein the control circuitry is further constructed and arranged to:
insert a blocking lock request of the first transaction into a queue of a first page; and
after inserting the blocking lock request, issue a non-blocking lock request of the first transaction for a second page that is higher in the predefined page ordering than the first page.

18. A computerized apparatus of claim 13, wherein inserting the first lock request includes issuing the first lock request as a first blocking lock request; and
wherein the control circuitry is further constructed and arranged to, while the first transaction is open, insert a second blocking lock request of the second transaction into a queue of a page that (i) is not included in the at least one page in common and (ii) is higher in the predefined page ordering than the at least one page in common.

19. A computer program product including a set of non-transitory, computer-readable media having instructions which, when executed by control circuitry of a computerized apparatus, cause the computerized apparatus to perform a method of managing locks in a transactional cache, the method comprising:

opening, in the transactional cache, (i) a first transaction that identifies a first plurality of pages to be accessed and (ii) a second transaction that identifies a second plurality of pages to be accessed, the first plurality of pages having at least one page in common with the second plurality of pages;

after opening the first transaction and the second transaction, selecting a target page that is highest in a predefined page ordering out of the at least one page in common, the second plurality of pages including a lower-ordered page that is lower in the predefined page ordering than the target page; and while the first transaction is open, (i) inserting a first lock request of the second transaction into a queue of the target page and (ii) preventing insertion of a second lock request of the second transaction into a queue of the lower-ordered page.

* * * * *